US007033700B2

(12) United States Patent
Phillips

(10) Patent No.: US 7,033,700 B2
(45) Date of Patent: *Apr. 25, 2006

(54) FORMULATION OF ZINC NEGATIVE ELECTRODE FOR RECHARGEABLE CELLS HAVING AN ALKALINE ELECTROLYTE

(75) Inventor: Jeffrey Phillips, Santa Clara, CA (US)

(73) Assignee: PowerGenix Systems, Inc., Yukon (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/980,124

(22) Filed: Nov. 1, 2004

(65) Prior Publication Data

US 2005/0112463 A1 May 26, 2005

Related U.S. Application Data

(63) Continuation of application No. 10/429,693, filed on May 6, 2003, now Pat. No. 6,811,926, which is a continuation of application No. PCT/CA01/01719, filed on Nov. 7, 2001.

(30) Foreign Application Priority Data

Nov. 10, 2000 (CA) .................................. 2325637

(51) Int. Cl.
*H01M 4/48* (2006.01)
*H01M 6/04* (2006.01)
*H01M 4/62* (2006.01)
*C25B 11/04* (2006.01)

(52) U.S. Cl. ...................... 429/231; 429/206; 429/232; 204/292

(58) Field of Classification Search ................ 429/231, 429/232, 206; 204/280, 291, 292
See application file for complete search history.

(56) References Cited

U.S. PATENT DOCUMENTS

| 3,287,164 A | * | 11/1966 | Arrance | ....................... 429/219 |
| 3,287,166 A | * | 11/1966 | Arrance | ....................... 429/219 |
| 3,951,687 A | | 4/1976 | Takamura et al. | ............ 429/94 |
| 5,215,836 A | | 6/1993 | Eisenberg | ................... 429/199 |
| 5,721,072 A | | 2/1998 | Mototani et al. | ........... 429/229 |

FOREIGN PATENT DOCUMENTS

| JP | 60167264 | 3/1985 |
| JP | 07-296813 | 11/1995 |
| JP | 07296813 | 11/1995 |
| JP | 0755087 | 1/1997 |

* cited by examiner

*Primary Examiner*—Patrick Joseph Ryan
*Assistant Examiner*—Thomas H. Parsons
(74) *Attorney, Agent, or Firm*—Beyer Weaver & Thomas, LLP

(57) ABSTRACT

A zinc electrode is provided for use in electrochemical cells having an alkaline electrolyte and high cycle life. The zinc electrode comprises a mixture of zinc oxide together with an inorganic fibre which contains silica and alumina. Preferably, the composition of the inorganic fibre is in the range of 80% to 99% alumina, and 1% to 20% silica. Typically, the zinc electrode will further comprise an inorganic fibre additive in the range of 2% to 15% by weight of the zinc oxide electrode. Also, the zinc electrode will typically further include 2% up to 10% of bismuth oxide.

9 Claims, No Drawings

FORMULATION OF ZINC NEGATIVE ELECTRODE FOR RECHARGEABLE CELLS HAVING AN ALKALINE ELECTROLYTE

CROSS-REFERENCE TO RELATED APPLICATIONS

This application is a continuation of U.S. patent application Ser. No. 10/429,693 (now U.S. Pat. No. 6,811,926) filed May 6, 2003, which is in turn a continuation of PCT/CA01/01719 filed Nov. 7, 2001. Both of these parent applications are incorporated herein by reference for all purposes.

FIELD OF THE INVENTION

This invention relates to alkaline galvanic cells having zinc electrodes and an alkaline electrolyte. More particularly, the present invention relates to high energy density rechargeable cells having a zinc or zinc-based negative electrodes, an alkaline electrolyte, and positive electrodes which may be nickel, silver, air, or iron.

BACKGROUND OF THE INVENTION

The provision of rechargeable zinc batteries having alkaline electrolytes is well known. Leaving aside the question of zinc/manganese dioxide cells, which find dominance in commercial fields supplying cells (batteries) for use in flashlights, toys, low drainage devices such as electric clocks, and the like, there is also a very large market and requirement for high energy density, high capacity cells and batteries such as nickel-zinc, silver-zinc, and zinc-air batteries, as well as a recently introduced super iron-zinc battery. A requirement is, however, that such cells and batteries must be cycled many times through discharge/charge cycles; leading in turn to several further requirements. The first is that the capacity of the rechargeable cell should not diminish significantly over a number of cycles, there should be no significant shape change—particularly of the zinc electrode—and no significant dendrite formation. Most especially, newly developed high energy density rechargeable zinc cells should be free or substantially free of toxicity, so as to be environmentally benign. This means, in particularly, that a robust, long-lasting, rechargeable battery must be brought to the market which contains no cadmium, no lead, and no mercury.

In the following discussion, the terms "cell" and "battery" may be used interchangeably. Of course, it is recognized that a cell comprises two electrodes, one positive and one negative, and an electrolyte; and a battery may comprise a number of cells which are joined together in series, parallel, or series/parallel. In many batteries, of course, there are a plurality of negative and positive plates and a common electrolyte all contained in a single casing; and in some cases, the plates may be bipolar. In other batteries, there may be a plurality of self-contained cells, each having their own positive and negative electrodes and electrolyte. Moreover, cells and batteries may be cylindrical or rectangular, they may comprise flat plates or rolled plates, and they may have a relatively low voltage of one or two volts. Batteries may have a relatively high voltage, in the range of twelve to sixteen volts, sometimes much higher. The present invention applies to any of the above considerations in respect of cells and batteries, as it relates to the structure of the electrodes.

Batteries in keeping with the present invention will find particular utility in traction markets, being used on scooters and bicycles, as well as in hybrid automobiles, and in the power tool market. In such markets, there is a very great necessity for sealed battery systems, which have high energy density and, therefore, relatively low weight per amp-hour unit capacity, as well as low cost per amp-hour unit capacity. Moreover, batteries in keeping with the present invention will provide high amp-hour capacity per unit volume.

A particular feature of the present invention is that long life, rechargeable zinc electrodes may be supplied which can be manufactured using equipment that is presently used for nickel cadmium or nickel metal-hydride production. Typically, electrodes which embody the present invention are pasted on a high conductivity, low resistance matrix or carrier, which might conveniently be manufactured from copper and/or suitable alloys thereof.

In order to minimize shape change and dendrite growth, and to provide a stable construction so as to achieve prolonged cycle life, high power over the life of the battery, and maximum energy density, careful choice must be made of the combination of the zinc electrode and the electrolyte for the battery.

Typically, batteries in keeping with the present invention employ a buffered borate electrolyte which is particularly such as that which is taught in EISENBERG U.S. Pat. No. 5,215,836, issued Jun. 1, 1993. That patent teaches alkaline galvanic cells having an electrolyte composition which comprises a solution of a salt formed by reacting boric acid (or, alternatively, phosphoric acid or arsenic acid) with an alkali or earth alkali hydroxide which is present in a sufficient amount to produce a stoichiometric excess of hydroxide to acid in the range of 2.5 to 11.0 equivalents per litre. As well, a soluble alkali or earth or earth alkali fluoride is present, in an amount corresponding to a concentration range of 0.01 to 1.0 equivalents per litre of total solution.

By suitable zinc formulation, as taught hereafter, together with use of the buffered borate electrolyte, degradation mechanisms that operate during cycling are inhibited.

DESCRIPTION OF THE PRIOR ART

The performance of rechargeable zinc electrodes in alkaline electrolytes has been the subject of many studies that encompass the zinc electrode composition and the interaction with the electrolyte. A performance inhibiting disfigurement of the zinc electrode occurs as cycling progresses. The most obvious effect is a lower than acceptable amp-hour capacity delivered at useable voltages. This tendency has been arrested by a number of approaches. The combination of more dilute potassium hydroxide electrolyte together with the addition of calcium hydroxide to the zinc electrode appears to be particularly effective (U.S. Pat. No. 4,358,517 issued Nov. 9, 1982 to JONES). Alternate approaches have used buffered electrolytes with and without fluoride additions that have also resulted in increased zinc electrode life span. Noteworthy among these approaches is that described in U.S. Pat. No. 5,453,336 issued Sep. 26, 1995 to ADLER et al. which teaches a mixture of alkaline electrolyte (2-12M) combined with a carbonate of 0.5-4M and a fluoride of 0.5-4M is particularly effective. U.S. Pat. No. 4,273,841 issued Jun. 16, 1981 to CARLSON describes another mixture that employs 5-10% hydroxide, 10-20% phosphate and 5-15% fluoride. EISENBERG describes two electrolyte formulations in U.S. Pat. No. 4,224,391 issued Sep. 23, 1980 and No. 5,215,836 issued Jun. 1, 1993. Both employ mixtures of potassium hydroxide and boric, phosphoric or arsenic acid. However the latter patent describes advantages of alkali fluorides in the range of 0.01 to 1 M. This should be implemented in combination with a more alkaline electrolyte.

Electrode additions of numerous oxide additives have been investigated and proved to be beneficial (U.S. Pat. No. 5,556,720 issued Sep. 17, 1996 to CHARKEY and U.S. Pat. No. 4,084,047 issued Apr. 11, 1978 to HIMY et al.). Some oxides are claimed to result in a conductive metal matrix that enhances electrode conductivity; others may result in the formation of beneficial alloys and a reduction in hydrogen evolution. Zinc fluoride and zinc titanate (U.S. Pat. No. 4,304,828 issued Dec. 8, 1981 to VAIDYANATHAN) and the direct additions of alkali fluoride to the zinc electrode have also been found beneficial (U.S. Pat. No. 4,017,665 issued Apr. 12, 1977 to SANDERA et al.).

It should also be noted that lead, cadmium, and mercury oxides are particularly favoured as electrode enhancement additives. However, these oxides impart a toxicity to the electrode that is undesirable—and, in some instances, unacceptable.

Moreover, the issue of shape change is one which is of concern and which has been addressed by use of alumina fibre with fluorine resin and mercury oxide. For example, Sanyo Electric published Japanese application No. 60056368 teaches binding the zinc active material with a fibrous connection network of a fluorine resin, and then causing alumina fibres to exist in the connection network so as to make a zinc electrode. In a further published Japanese application No. 60167264, dendrite formation is suppressed by forming a thin layer containing alumina fibre and a cadmium compound on the surface of a zinc active material layer. Also, published Japanese application No. 61104564 teaches inhibiting the development of zinc dendrite by using an additive in addition to the oxide or hydroxide of indium in the zinc electrode.

DETAILED DESCRIPTION OF THE PREFERRED EMBODIMENTS

The novel features which are believed to be characteristic of the present invention, as to its structure, organization, use and method of operation, together with further objectives and advantages thereof, will be better understood from the following discussion.

The benefit of a non-toxic zinc electrode is well recognized. However, small quantities of toxic metal oxides are routinely added to the zinc electrode of rechargeable cells to facilitate long cycle life.

It has been unexpectedly found that a non-toxic electrode with good cycle life can be prepared with the addition of alumina, silica and bismuth oxide. Good capacity maintenance and excellent resistance to shape change have been achieved when a zinc electrode is fabricated using inorganic fibers with a composition of 80–99% aluminum oxide and 1°20% silica. Electrodes have been found effective when such fibers constitute between 2–15% by weight of a zinc oxide electrode. Between 2–10% bismuth oxide is also present and appears beneficial.

The zinc oxide and additives are pasted onto a copper current collector and wrapped in separator prior to cell assembly, electrolyte addition, and plate formation. In such cells, the electrolyte of choice is comprised of a mixture of boric acid with a concentration between 0.6 and 1.3M and a stoichiometric excess of alkali hydroxide between 2.7 & 5 moles per liter.

The exact mechanism of the benefit is not known. However, it is suspected that the silica-alumina fibers provide an irrigation benefit, together with a chemical capability to reduce the solubility of the zinc hydroxide that is produced during zinc electrode discharge.

Other modifications and alterations may be used in the design and manufacture of the apparatus of the present invention without departing from the spirit and scope of the accompanying claims.

What is claimed is:

1. An electrochemical cell comprising:
    a zinc electrode comprising a mixture of zinc oxide together with an inorganic fibre; and
    a buffered electrolyte comprising a salt of boric acid present in a concentration of between 0.6 and 1.3M, and a stoichiometric excess of alkali hydroxide between 2.7 and 5 moles per liter.

2. The electrochemical cell of claim 1, wherein the zinc electrode further comprises 2% up to 10% of bismuth oxide.

3. The electrochemical cell of claim 1, wherein the zinc electrode is provided on a matrix of copper or an alloy thereof.

4. The electrochemical cell of claim 1, wherein the cell is provided in a power tool.

5. The electrochemical cell of claim 1, wherein the electrolyte further comprises an alkali or alkaline earth fluoride.

6. The electrochemical cell of claim 5, wherein the fluoride is present in an amount corresponding to a concentration range of 0.01 to 1 equivalents per liter of the electrolyte.

7. The electrochemical cell of claim 1, further comprising a nickel positive electrode.

8. The electrochemical cell of claim 1, further comprising a separator.

9. The electrochemical cell of claim 8, wherein the separator wraps said zinc electrode.

* * * * *